United States Patent [19]
Avitan

[11] Patent Number: 5,826,958
[45] Date of Patent: Oct. 27, 1998

[54] APPARATUS FOR AUTOMATICALLY CONDITIONING RECHARGEABLE BATTERIES

[75] Inventor: Asher Avitan, Granada Hills, Calif.

[73] Assignee: Ora Electronics, Inc., Chatsworth, Calif.

[21] Appl. No.: 573,290

[22] Filed: Dec. 15, 1995

[51] Int. Cl.[6] .................................................. H02J 7/00
[52] U.S. Cl. ................................... 320/40; 320/2; 320/5; 320/14; 320/39
[58] Field of Search .............................. 320/5, 2, 14, 13, 320/21, 39–40, 35–36, 30–31, 34

[56] References Cited

U.S. PATENT DOCUMENTS

| | | | |
|---|---|---|---|
| 3,997,830 | 12/1976 | Newell et al. | 320/14 X |
| 4,084,124 | 4/1978 | Kapustka | 320/13 X |
| 4,342,954 | 8/1982 | Griffith | 320/14 |
| 4,455,523 | 6/1984 | Koenck | 320/35 X |
| 4,517,517 | 5/1985 | Kinney | 320/48 |
| 4,734,635 | 3/1988 | Theobald | 320/13 |
| 4,755,733 | 7/1988 | Laliberte | 320/14 X |
| 5,159,258 | 10/1992 | Kolvites et al. | 320/14 |
| 5,196,779 | 3/1993 | Alexandres et al. | 320/14 |
| 5,252,411 | 10/1993 | Yokokawa et al. | 320/36 X |
| 5,283,511 | 2/1994 | Keener et al. | 320/14 X |
| 5,343,138 | 8/1994 | Ainsworth | 320/14 |
| 5,355,072 | 10/1994 | Satsuma et al. | 320/14 X |
| 5,430,363 | 7/1995 | Kim | 320/35 X |
| 5,432,429 | 7/1995 | Arnstrong, II et al. | 320/14 X |
| 5,459,671 | 10/1995 | Duley | 320/48 X |
| 5,479,084 | 12/1995 | Satsuma et al. | 320/13 |
| 5,488,282 | 1/1996 | Hayden et al. | 320/14 |
| 5,504,411 | 4/1996 | McCaleb et al. | 320/2 |
| 5,518,832 | 5/1996 | Fernandez et al. | 320/31 X |
| 5,600,231 | 2/1997 | Parker | 320/13 X |

*Primary Examiner*—Peter S. Wong
*Assistant Examiner*—K Shin
*Attorney, Agent, or Firm*—Matthew F. Jodziewicz

[57] ABSTRACT

A circuit for conditioning a battery having a casing and battery charging terminals for charging the battery from an external power source. The conditioning circuit is preferably contained within the battery casing and comprises a discharging circuit for discharging the electrical charge of the battery and a switching circuit coupled to the battery charging terminals and to the discharging circuit for automatically selecting between a first state, disabling the battery charging terminals from providing charging access to the battery and coupling the discharging circuit to the battery for discharging the battery as long as the battery voltage is above a predetermined voltage level, and a second state, disconnecting the discharging circuit from the battery whenever the battery voltage is at or below the predetermined voltage level and enabling the battery charging terminals for providing charging access to the battery.

25 Claims, 1 Drawing Sheet

APPARATUS FOR AUTOMATICALLY CONDITIONING RECHARGEABLE BATTERIES

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates, in general, to devices for conditioning batteries susceptible to a memory effect, such as nickel cadmium batteries used in cellular telephones and other wireless network access devices, and, in particular, in circuitry for conditioning a rechargeable battery pack that permits automatic conditioning of the battery before charging to lessen the cumulative memory effect on the battery cells.

2. Known Prior Art

Portable electronic devices, such as calculators, cellular telephones, mobile facsimile machines, wireless personal assistants and other wireless network access devices, are fast becoming essential business tools. However the usefulness of these devices depends on their mobility, which, in turn, depends upon their batteries, as most of these devices are used away from readily available external power sources.

Many such devices depend upon sophisticated chemical cells such as nickel cadmium batteries for their mobile power source. These cells provide an excellent source of power, but suffer from a defect commonly called a memory effect.

In general, the memory effect appears as a characteristic of some types of batteries that, unless the battery is fully discharged below a certain limit prior to charging, it will, after repeated rechargings, come to lose its ability to hold a charge and will quickly discharge when used. Users then, when faced with this situation, mistakenly believe the battery to be defective and worthless.

Strangely enough, the more conscientious a user is in keeping his batteries charged after each use, thinking to maintain them at nearly full charge, the quicker the cumulative effects of the memory effect accrue and, directly contrary to the user's intentions, the quicker the batteries become depleted and undependable.

To remedy this problem, there are commercially available charging units that first condition or automatically discharge the battery below the memory effect threshold voltage before they begin the charging cycle. These conditioning chargers are both expensive and not readily available for the common user. These automatic conditioning chargers cannot be retrofitted into existing chargers and are usually specific to a single battery.

There is no known method or apparatus that provides for the automatic discharging of a battery for conditioning prior to charging that is suitable for use with all chargers.

While an important embodiment of the invention will be discussed as applied to battery packs useful for wireless network access devices such as cellular telephones, the invention is not restricted to batteries for such devices, but also includes batteries for other devices that are prone to the memory effect described above.

OBJECTIVES AND SUMMARY OF THE INVENTION

It is therefore an object of the present invention to provide a circuit and method for automatically conditioning a rechargeable battery prior to recharging to avoid the cumulative memory effect.

It is a further object of the present invention to provide a circuit capable of operation in conjunction with existing non-conditioning chargers that does not require modification of the operation of the charger unit.

It is another object of the present invention to provide a circuit and method for automatically conditioning a rechargeable battery prior to recharging to avoid the cumulative memory effect and which circuit can be contained within the battery casing to provide a self-contained unit.

The present invention then, is embodied in a circuit for conditioning a battery having a casing and battery charging terminals for charging the battery from an external power source. The conditioning circuit is preferably contained within the battery casing and comprises a discharging circuit for discharging the electrical charge of the battery and a switching circuit coupled to the battery charging terminals and to the discharging circuit for automatically selecting between a first state, disabling the battery charging terminals from providing charging access to the battery and coupling the discharging circuit to the battery for discharging the battery as long as the battery voltage is above a predetermined voltage level, and a second state, disconnecting the discharging circuit from the battery whenever the battery voltage is at or below the predetermined voltage level and enabling the battery charging terminals for providing charging access to the battery.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

Figure 1:
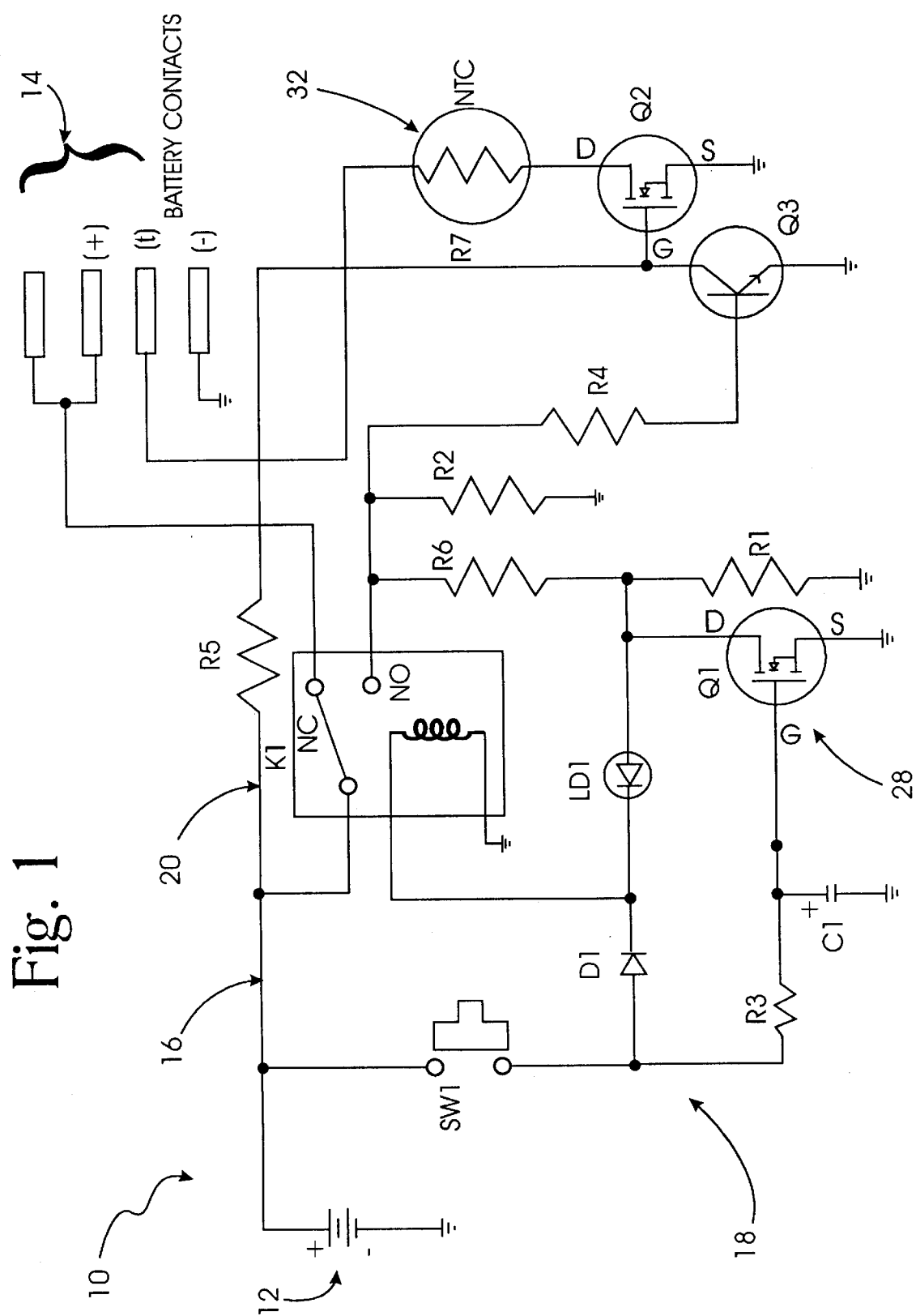
FIG. 1 is a schematic diagram of a circuit that embodies the present invention.

A preferred embodiment and operation of the invention in a circuit 10 for conditioning a battery 12 having a casing and battery charging terminals 14 for charging the battery from an external power source is now described with reference to the accompanying drawing in FIG. 1.

After the main operating circuit blocks and elements are described, the operation of the overall circuit will be discussed.

Normally, battery charging terminals 14 are mounted on the battery casing for external access by a charger unit.

Preferably, the conditioning circuit 10 is contained within the battery casing for ease of use and to insure that the battery and conditioning circuit may be easily manufactured as a single operative unit for use by a user.

Conditioning circuit 10 preferably includes a battery discharging circuit for discharging the electrical charge of a battery 12. One preferable discharging circuit is shown in FIG. 1 as a resistor element R2. Other energy dissipating elements may be used, but a resistor is a common and easy method for dissipating battery energy.

Since discharging a battery normally generates heat, a heat dissipating element, or structure, is also preferably included in the conditioning circuit. One of such heat dissipating elements is a heat sink designed to radiate off the heat generated by resistor R2 to avoid safety problems as noted further below in describing the negative temperature coefficient circuit or temperature safety alarm circuitry found in many rechargeable batteries.

Switching circuitry 18 is coupled to battery charging terminals 14 and to the discharging circuit (resistor R2) for automatically selecting between a first state where battery charging terminals 14 are disabled from providing charging access to battery 12 and the discharging resistor R2 is coupled to battery 12 for discharging the battery as long as the battery voltage is above a predetermined voltage level, and a second state where the discharging circuit (resistor R2) is disconnected from battery 12 whenever the battery voltage is at or below the predetermined voltage level and battery charging terminals 14 are enabled for providing charging access to battery 12.

Switching circuitry 18 preferably includes a voltage sensitive latching circuit 20 that is responsive to the battery voltage level, for holding switching circuit 18 in the first or second state.

FIG. 1 shows one such preferably latching circuit 20 to include an electromagnetic relay K1 having contacts whose position is selected by the energized state of coil K1. In the schematic shown in FIG. 1, the relay contacts are shown to be normally closed, but normally open contacts and appropriate rewiring of the circuitry elements would also work. In fact, various bistable circuits such as a solid state latching circuit such as a flip-flop circuit could also be incorporated in place of the electromagnetic or mechanical relay shown in the schematic.

Manually operated, momentarily closed, push button switch SW1 activates switching circuit 18.

While these elements are sufficient to embody the present invention, the preferred embodiment shown in the schematic also includes a user controlled override circuit 28 that permits a user to toggle, both selectively and manually, switching circuitry 18 between its first and second states.

Override circuit 28 also utilizes switch SWi in conjunction with a timing circuit comprised of a resistor/capacitor charging circuit (shown as R3 and C1 respectively) used with a transistor Q1.

An indicator light LD1 (shown as a LED in the schematic) is coupled to switching circuit 18 for providing a signal indicating whether switching circuit 18 is in the first or second state.

Many rechargeable battery packs incorporate an internal temperature sensing safety alarm circuit 32 (shown in the schematic as a negative temperature coefficient element NTC) that is usually contained within the battery pack casing to monitor the heat generated by any charging units attempting to either condition and charge, or just charge the batteries. This is a safety feature designed to avoid a thermal runaway or other melting problems that may arise during a external charging unit's conditioning/recharging cycle.

Therefore, to better accommodate batteries having a temperature sensitive alarm circuit, switching circuit 18 is preferably coupled to the temperature sensing safety alarm circuit 32 as well as to battery charging terminals 14 and the discharging circuit R2 for automatically selecting between a first state where the internal temperature sensitive safety alarm circuit 32 is disabled, and battery charging terminals 14 are also disabled from providing charging access to battery 12 and coupling the discharging circuit R2 to battery 12 for discharging the battery 12 as long as the battery voltage is above a predetermined voltage level, and a second state enabling the internal temperature sensitive safety alarm circuit 32 and disconnecting discharging circuit 16 from battery 12 whenever the battery voltage is at or below the predetermined voltage level and enabling battery charging terminals 14 for providing charging access to battery 12.

FIG. 1 shows one such preferred circuit for disabling the internal temperature sensitive safety alarm circuit 32 that incorporates transistors Q2 and Q3 connected to the negative temperature coefficient element NTC.

With these main circuit blocks and elements having been described, the operation of the overall conditioning circuit will now be discussed.

A user initiates the conditioning circuit by closing push button switch SW1, a momentary close push button switch, which causes relay coil K1 to become energized, thereby opening the relay contacts and disabling battery charging terminals 14.

Once relay coil K1 is energized, the coil contacts remain latched open until the voltage from battery 12 is depleted below a predetermined voltage level and relay coil K1 releases the coil contacts which switch back to enable battery charging terminals to once again provide a charging path to battery 12.

The user controlled override circuit 28 is provided for by the transistor Q1 operating in conjunction with resistor R3 and capacitor C1. Resistor R3 and capacitor C1 operate to provide a timing standard due to the RC charging characteristic of these two elements. Once the resistor/capacitor combination has reached a predetermined charge level, transistor Q1 switches from its normally blocked operation and begins to conduct battery voltage and current to ground, thereby by-passing relay coil K1 and allowing relay coil K1 to de-energize and release the coil contacts. In general, this override circuit 28 is actuated by the user holding push button switch SW1 in its closed configuration for a time sufficient to allow the resistor R3 and capacitor C1 combination to charge, i.e., usually longer than that necessary merely to activate the relay coil K1 which would occur almost instantaneously when the switch SW1 is closed.

Switching circuit 18 also provides for canceling the negative temperature coefficient safety alarm circuit NTC during discharge of the battery by rendering it non-conductive during discharge. This is accomplished via transistor combination Q2 and Q3 which are normally non-conducting while the relay coil K1 is energized and become conducting to allow the negative temperature coefficient element NTC to operate once again when relay coil K1 is de-energized and the relay contacts are released to their normally closed position.

To complete the description of the circuit operation, resistors R1 and R6 act as a voltage divider for the LED LD1, and diode D1 acts to block the current from reaching the resistor/capacitor R3/C1 charging combination discussed above except when the push button switch SW1 is closed as described above.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A circuit for conditioning a battery having a casing and battery charging terminals for charging the battery from an external power source, and further having an internal temperature sensing safety alarm circuit, said conditioning circuit contained within the battery casing and comprising:

discharging means for discharging the electrical charge of a battery;

switching means coupled to the internal temperature sensing safety alarm circuit and the battery charging terminals and to said discharging means for automatically selecting between a first state disabling the internal temperature sensitive safety alarm circuit and the battery charging terminals from providing charging access to the battery and coupling said discharging means to the battery for discharging the battery as long as the battery voltage is above a predetermined voltage level, and a second state enabling the internal temperature sensitive safety alarm circuit and disconnecting said discharging means from the battery whenever the battery voltage is at or below said predetermined voltage level and enabling the battery charging terminals for providing charging access to the battery.

2. A circuit as in claim 1 further comprising:

user controlled means for selectively placing said switching means into said first or said second state.

3. A circuit as in claim 2 wherein said user controlled means for placing said switching means into said first or said second state comprises a manually operated monetary closed push switch.

4. A circuit as in claim 1 wherein said battery discharging means includes a resistive device.

5. A circuit as in claim 1 further including means coupled to said discharging means for dissipating heat generated by operation of said discharging means.

6. A circuit as in claim 1 further including indicator means coupled to said switching means for providing a signal indicating whether said switching means is in said first state or said second state.

7. A circuit as in claim 6 wherein said indicator means further includes a light emitting diode.

8. A circuit as in claim 1 wherein said switching means further comprises:

latching circuit means responsive to the battery voltage level, for disabling the battery charging terminals from providing charging access to the battery and coupling said discharging means to the battery for so long as the battery voltage is above said predetermined voltage level, and disconnecting said discharging means from the battery whenever the battery voltage is at or below said predetermined voltage level and enabling the battery charging terminals for providing charging access to the battery.

9. A circuit as in claim 8 wherein said latching circuit means includes:

a voltage sensitive switching circuit.

10. A circuit as in claim 8 wherein said latching circuit means includes an electromagnetically operated mechanical relay.

11. A circuit as in claim 8 wherein said latching circuit means includes a solid state latching circuit.

12. A circuit as in claim 8 wherein said latching circuit means includes a flip-flop circuit.

13. A circuit as in claim 1 wherein said switching means further comprises:

user controlled override circuit means for selectively toggling said switching means between said first and second states.

14. A circuit as in claim 13 wherein said user controlled override circuit means includes a timing circuit.

15. A circuit as in claim 14 wherein said timing circuit includes a resistor-capacitor charging circuit for timing.

16. A circuit for conditioning a battery having a casing and battery charging terminals for charging the battery from an external power source and further having an internal battery temperature sensing safety alarm circuit, said conditioning circuit contained within the battery casing and comprising:

discharging means for discharging the electrical charge of a battery;

switching means, coupled to the internal battery temperature sensing safety alarm circuit and to the battery charging terminals and to said discharging means for automatically selecting between a first state disabling the internal battery temperature sensitive safety alarm circuit and preventing the battery charging terminals from providing charging access to the battery and coupling said discharging means to the battery for discharging the battery as long as the battery voltage is above a predetermined voltage level, and a second state enabling the internal battery temperature sensing safety alarm circuit and disconnecting said discharging means from the battery whenever the battery voltage is at or below said predetermined voltage level and enabling the battery charging terminals for providing charging access to the battery, said switching means including a voltage sensitive latching circuit means responsive to the battery voltage level, for holding said switching means in said first or said second state, and further including user controlled override circuit means for selectively manually toggling said switching means between said first and second states; and, indicator means coupled to said switching means for providing a signal indicating whether said switching means is in said first state or said second state.

17. A circuit as in claim 16 wherein said user controlled means for placing said switching means into said first or said second state comprises a manually operated momentary closed push switch.

18. A circuit as in claim 16, wherein said battery discharging means includes a resistive device.

19. A circuit as in claim 16 further including means coupled to said discharging means for dissipating heat generated by operation of said discharging means.

20. A circuit as in claim 16 wherein said indicator means further includes a light emitting diode.

21. A circuit as in claim 16 wherein said latching circuit means includes an electromagnetically operated mechanical relay.

22. A circuit as in claim 16 wherein said latching circuit means includes a solid state latching circuit.

23. A circuit as in claim 16 wherein said latching circuit means includes a flip-flop circuit.

24. A circuit as in claim 16 wherein said user controlled override circuit means includes a timing circuit.

25. A circuit as in claim 24 wherein said timing circuit includes a resistor-capacitor charging circuit.

* * * * *